UNITED STATES PATENT OFFICE.

EDWARD D. KENDALL, OF BROOKLYN, NEW YORK.

COMPOSITION OF MATTER FOR THE EXTRACTION OF GOLD AND SILVER FROM ORES.

SPECIFICATION forming part of Letters Patent No. 482,577, dated September 13, 1892.

Application filed May 27, 1892. Serial No. 434,528. (No specimens.)

*To all whom it may concern:*

Be it known that I, EDWARD D. KENDALL, a citizen of the United States, residing at Brooklyn, in the county of Kings and State of New York, have invented a new and useful composition of matter to be used for the extraction of gold and silver from ores, so-called "tailings," and other matters containing one or both of these metals, of which composition the following is a specification.

My composition consists of the following ingredients, combined as hereinafter stated: water, (hot or cold,) potassium ferricyanide, (or other soluble ferricyanide,) and potassium cyanide, (or other soluble cyanide.) The best proportions of the two last-mentioned constituents vary somewhat with the different ferricyanides and cyanides and may be determined by calculation based on the molecular weights of the salts or the chemical equivalents of their elements, and also by considering that the purpose of my composition is to set free cyanogen to form—for example, when the potassium salts are used—the soluble double cyanide of gold or silver and potassium, and by applying my theory of the chemical reactions which occur, set forth in the following formula:

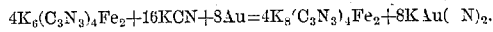

The indicated proportions are, therefore, practically, by weight two and one-half parts of potassium ferricyanide and one part of potassium cyanide, and these proportions I have found satisfactory in practice; but they may be varied within wide limits without departing from my invention- The potassium ferricyanide, which is a product of the chemical action, facilitates the solution of the resulting cyanides and after the separation of the precious metal from the menstruum by appropriate means may be utilized by a process which I propose to make the subject of a separate application.

To prepare my composition, I dissolve the ferro-cyanide in one portion of water and the cyanide in another portion and mix the two solutions, or either salt in solid form may be added to the solution of the other. In dissolving the salts I do not always confine myself to a specific proportion of water. More or less water may be used. As a rule, the more concentrated the composition the more energetic its action, but the more costly. Except in treating substances very rich in gold or silver, my composition will always be used in a more or less dilute condition.

In using the herein-described composition, the gold and silver bearing minerals, tailings, and other matters, cold or while moderately heated, with or without prior chemical or mechanical treatment, should be placed in tanks or troughs or other receptacles made of any suitable material, as wood, (if of wood, preferably lined with stoneware slabs,) and thoroughly drenched, soaked, or impregnated with my composition, which is after a time to be drawn off and washed out or displaced with water in order that the contained precious metal may be separated by subsequent operations.

The composition may be used hot or cold. The effect of heat is to hasten the chemical and solvent action.

What I claim, and desire to secure by Letters Patent of the United States, is—

The before-described composition of matter, to be used for extracting gold and silver from minerals, tailings, and other matters containing one or both of these metals, consisting of water, one or more soluble ferricyanides, and one or more soluble cyanides, prepared and combined as herein stated.

EDWARD D. KENDALL.

Witnesses:
EDWARD M. McCOOK,
S. J. STORRS.